United States Patent [19]
Shaffer

[11] Patent Number: 5,806,222
[45] Date of Patent: Sep. 15, 1998

[54] COMPUTER DISK LABEL AND ASSOCIATED METHOD

[76] Inventor: Kenneth E. Shaffer, 14582 Mandolin Dr., Orlando, Fla. 32837

[21] Appl. No.: 691,511

[22] Filed: Aug. 2, 1996

[51] Int. Cl.⁶ ....................................................... G09F 3/10
[52] U.S. Cl. ................................. 40/638; 40/672; 40/675; 283/81
[58] Field of Search .................................. 40/299.01, 766, 40/630, 492, 638, 537, 661.09, 124.09, 675, 661.06, 672; 283/81

[56] References Cited

U.S. PATENT DOCUMENTS

| | | | |
|---|---|---|---|
| 3,726,030 | 4/1973 | Wilson | 283/81 X |
| 4,507,883 | 4/1985 | Tarrant . | |
| 4,618,061 | 10/1986 | Rubenfeld . | |
| 4,745,695 | 5/1988 | Hetzer | 40/661 |
| 4,784,408 | 11/1988 | Yasuda | 283/81 |
| 5,119,933 | 6/1992 | Taylor . | |
| 5,154,290 | 10/1992 | Chieng . | |
| 5,234,735 | 8/1993 | Baker et al. | 40/638 X |
| 5,437,477 | 8/1995 | Olivera et al. | 283/81 |

FOREIGN PATENT DOCUMENTS 9320547  10/1993  WIPO ....................................... 40/638

Primary Examiner—Brian K. Green
Attorney, Agent, or Firm—Allen, Dyer, Doppelt, Milbrath & Gilchrist, P.A.

[57] ABSTRACT

A computer disk label includes an outer panel including a base portion for being connected to the disk jacket, a flapper portion connected to the base portion so that the flapper portion is movable between a closed position adjacent the jacket and an open position extending outwardly from the base portion, and a pocket defining portion connected to the base portion for defining a pocket in cooperation with an adjacent portion of the disk jacket. In addition, the disk label preferably includes a flapper panel connected to the flapper portion and being movable therewith between the closed and open positions. The flapper panel preferably has a tip extending outwardly beyond an edge of the flapper portion of the outer panel so that the tip of the flapper panel may be received within the pocket when in the closed position. The label may include an intermediate panel positioned between the base portion of the outer jacket panel and the jacket and between the flapper portion of the outer panel and the flapper panel. An adhesive layer may be provided on each surface of the intermediate panel. Method aspects are also disclosed.

29 Claims, 5 Drawing Sheets

COMPUTER DISK LABEL AND ASSOCIATED METHOD

FIELD OF THE INVENTION

The present invention relates to the field of labels, and more particularly, to a label for a computer disk and a method for making the label.

BACKGROUND OF THE INVENTION

Computer disks are widely used to store and transfer data for computers. A typical computer disk includes a generally square jacket, envelope, or housing in which a disk of magnetic recording media is positioned. The jacket may be a relatively rigid plastic material for a typical 3.5 inch disk, for example. The computer disk is positioned in a disk drive of a computer which rotates the media disk for reading or writing data. A slidable door may be connected to an end of the jacket and covers the media disk when removed from the disk drive and is retracted during operation in the disk drive.

A typical computer disk includes an upper surface portion for receiving a label. The label typically wraps around an edge portion of the disk so that a small label portion is exposed on a bottom surface portion of the disk as disclosed, for example, in U.S. Pat. No. 5,154,290 to Chieng. U.S. Pat. No. 4,618,061 to Rubenfeld discloses a removable cover for a write protect tab of a disk and which cover includes spaced lines for receiving user indicia. Along these lines, U.S. Pat. No. 4,507,883 to Tarrant discloses a label for receiving user indicia, and wherein the label is adhesively secured to an upper surface portion of the disk jacket.

A conventional disk label may include identifying information such as the program contained on the disk and the program publisher, or may provide lined spaces for the user to list files or programs contained on the disk. Unfortunately, the disk is typically fully received into the disk drive of the computer during normal use. Accordingly, the conventional disk label is not visible without first removing the disk from the disk drive.

U.S. Pat. No. 5,119,933 to Taylor discloses a computer disk sleeve which has a portion adhesively attached to the jacket of the computer disk. Upon attachment of the sleeve to the computer disk, the disk and the sleeve define an integral package. One embodiment of the device includes a disk sleeve blank which, in turn, includes an envelope body portion, an accordion fold portion and an adhesive coated portion. In a closed configuration, the sleeve forms a pocket which encloses the disk. The sleeve may also be used as a mailer. The sleeve may also be configured in an unfolded condition so that a portion extends outside and is visible with the disk inserted into a disk drive. Accordingly, the user may view instructions or other indicia on the sleeve while the disk is being used.

Unfortunately, embodiments of the sleeve disclosed in the patent to Taylor may be relatively complicated to manufacture and install on a computer disk. The mailer embodiments may also be somewhat cumbersome to use and not typically needed. In a more simple embodiment of the Taylor computer disk sleeve, the sleeve includes a bib portion and an outer envelope portion. The bib portion has a panel and an area defined by two spaced apart tabs which, in turn, are adhesively secured to the disk. Unfortunately, the sleeve is also cumbersome to use and may be difficult to manufacture and install on a computer disk.

SUMMARY OF THE INVENTION

In view of the foregoing background, it is therefore for an object of the present invention to provide a computer disk label including a portion which is selectively exposed during use of the disk in the disk drive of a computer.

It is another object of the present invention to provide a computer disk label and associated method for readily manufacturing and installing the label.

These and other objects, features, and advantages of the present invention are provided by a computer disk label which in one embodiment includes an outer panel comprising a base portion for being connected to the jacket, and a flapper portion connected to the base portion defining a hinge so that the flapper portion is movable between a closed position adjacent the jacket and an open position extending outwardly from the base portion. The outer panel preferably also preferably includes a pocket defining portion connected to the base portion for defining a pocket in cooperation with an adjacent portion of the disk jacket. In addition, the disk label preferably includes a flapper panel connected to the flapper portion and being movable therewith between the closed and open positions. The flapper panel preferably has a tip extending outwardly beyond an edge of the flapper portion of the outer panel so that the tip of the flapper panel may be received within the pocket when in the closed position. The flapper portion and flapper panel can be moved between a closed position with the tip tucked into the pocket and appearing as a conventional label and, an extended position exposing the underside of the flapper panel which, in turn, preferably includes indicia thereon.

The flapper portion of the outer panel is preferably connected to the base portion adjacent an edge of the disk jacket to thereby provide a hinge at the edge. The computer disk label may also preferably include securing means for securing the base portion of the outer panel to the jacket, and for securing the flapper portion of the outer panel to the flapper panel. The securing means preferably comprises at least one adhesive layer positioned between the base portion of the outer panel and the jacket and between the flapper portion of the outer panel and the flapper panel.

The securing means may also be provided by an intermediate panel positioned between the base portion of the outer jacket panel and the jacket and between the flapper portion of the outer panel and the flapper panel, and an adhesive layer on each opposing surface of the intermediate panel. Yet another feature of the disk label is that a line of weakness may be provided in the intermediate panel to further define a hinge between the flapper portion and base portion of the outer panel. The intermediate panel also preferably has an opening therein in registry with the pocket defining portion of the outer panel. Accordingly, manufacturing and assembly are greatly facilitated.

The computer disk jacket is preferably of the type including a pair of opposing surfaces and a plurality of edge portions between opposing surfaces. The base portion of the outer panel preferably includes a wrap around position for covering a portion of the edge and back surface of the jacket.

Indicia may be provided on a the outer panel, such as in the form of spaced lines for receiving handwritten information. Moreover, the computer disk label preferably further comprises indicia on the flapper panel so as to be exposed when in the open position.

A method aspect of the present invention is for making a computer disk label to be positioned on a jacket of a computer disk. The method preferably comprises the steps of: providing a flapper panel; mounting the flapper panel to the jacket so that the flapper panel is movable between a closed position wherein the flapper panel is adjacent the jacket and an open position wherein the flapper panel extends outwardly from the jacket; and receiving a tip of the flapper panel within a pocket on the jacket when the flapper panel is in the closed position. The step of mounting preferably comprises the steps of providing an outer panel comprising a base portion for being connected to the jacket, and a flapper portion connected to the flapper panel and connected to the base portion defining a hinge therewith; and securing the outer panel to the jacket.

The step of securing may include the steps of providing an adhesive between the base portion of the outer panel and the jacket, and between the flapper portion of the outer panel and the flapper panel. More particularly, the step of securing preferably comprises the steps of positioning an intermediate panel between the base portion of the outer panel and the jacket, and between the flapper portion of the outer panel and the flapper panel, and providing an adhesive layer on opposing surfaces of the intermediate panel.

The method may further comprise the step of forming a line of weakness in the intermediate panel to further define a hinge between the flapper portion and base portion of the outer panel. In addition, the method may also further comprise the step of providing indicia on the flapper panel so as to be exposed when in the open position.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 1:
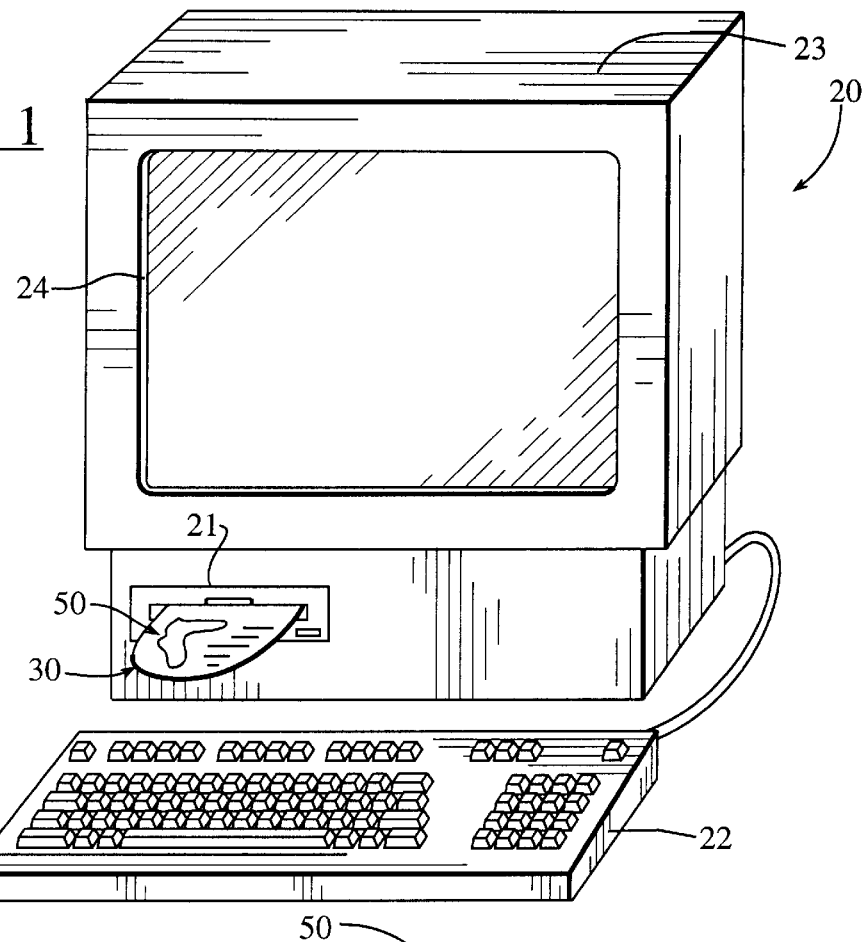
FIG. 1 is a perspective view of a computer and a computer disk inserted therein illustrating a portion of the computer disk label extending outwardly in accordance with the invention.
Figure 2:
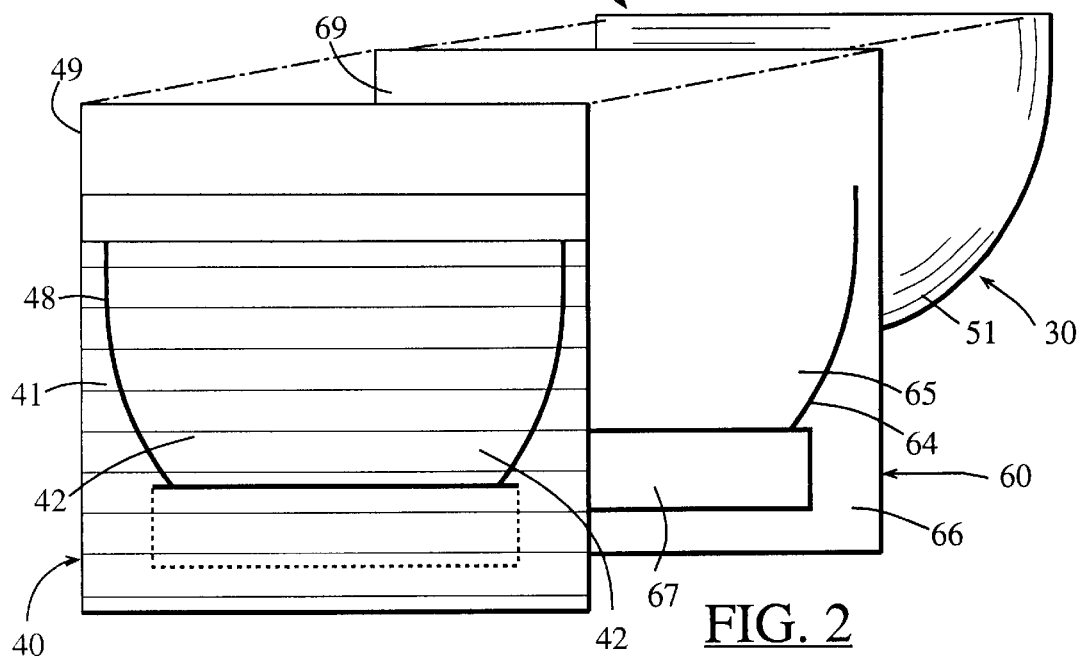
FIG. 2 is an exploded perspective view of the computer disk label in accordance with the invention.
Figure 3:
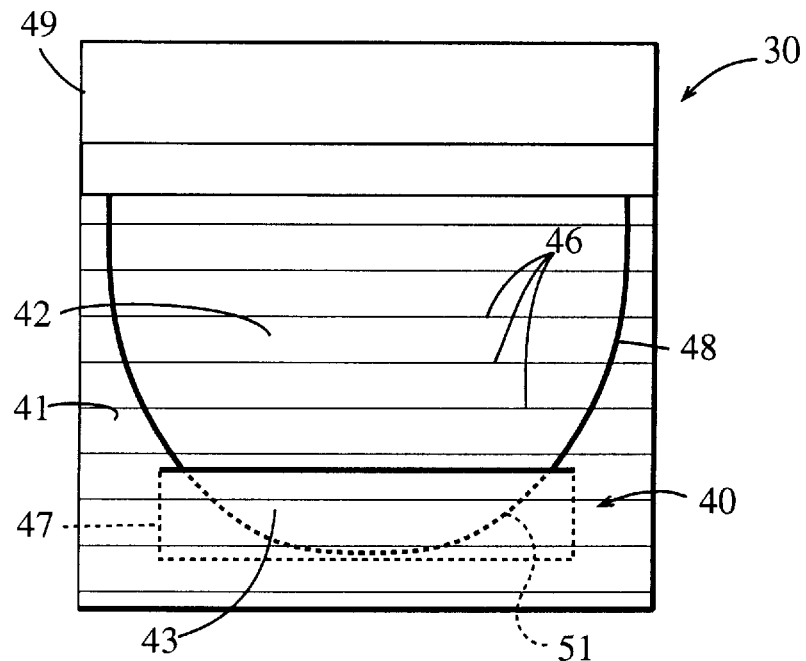
FIG. 3 is a top plan view of the computer disk label in accordance with the invention.
Figure 4:
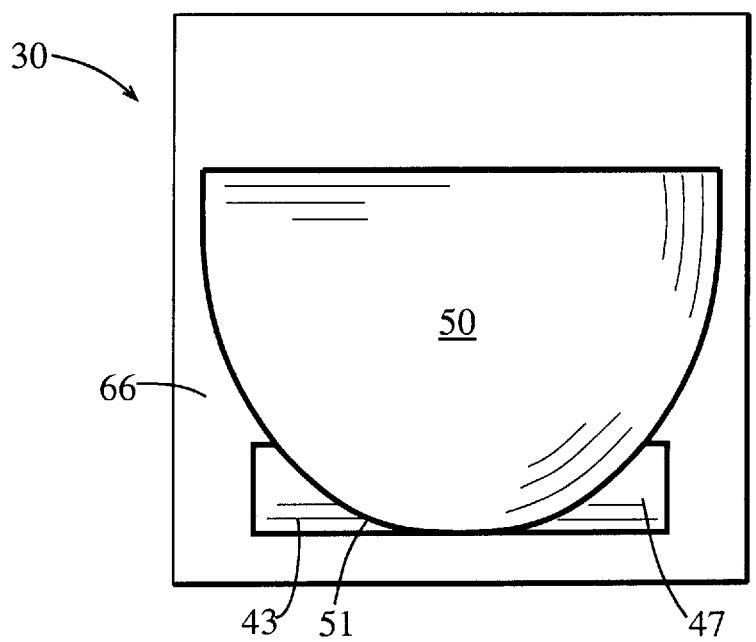
FIG. 4 is a bottom plan view of the computer disk label in accordance with the invention.
Figure 5:
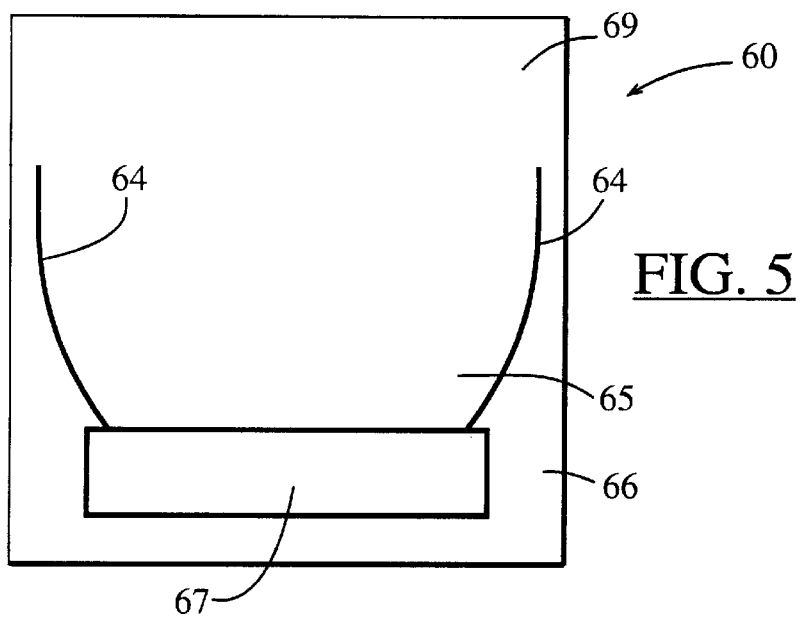
FIG. 5 is a top plan view of the intermediate panel of the computer disk label in accordance with the invention.

Referring to the drawings, the computer disk label 30 in accordance with the present invention is now described. The computer disk label 30 may be secured to a conventional 3.5 inch computer disk for insertion into a disk drive 21 of a computer 20 as shown in FIG. 1 and as would be readily appreciated by those skilled in the art. The computer 20 may also include a keyboard 22, housing 23 and integral display 24 as illustrated.

Figure 8:
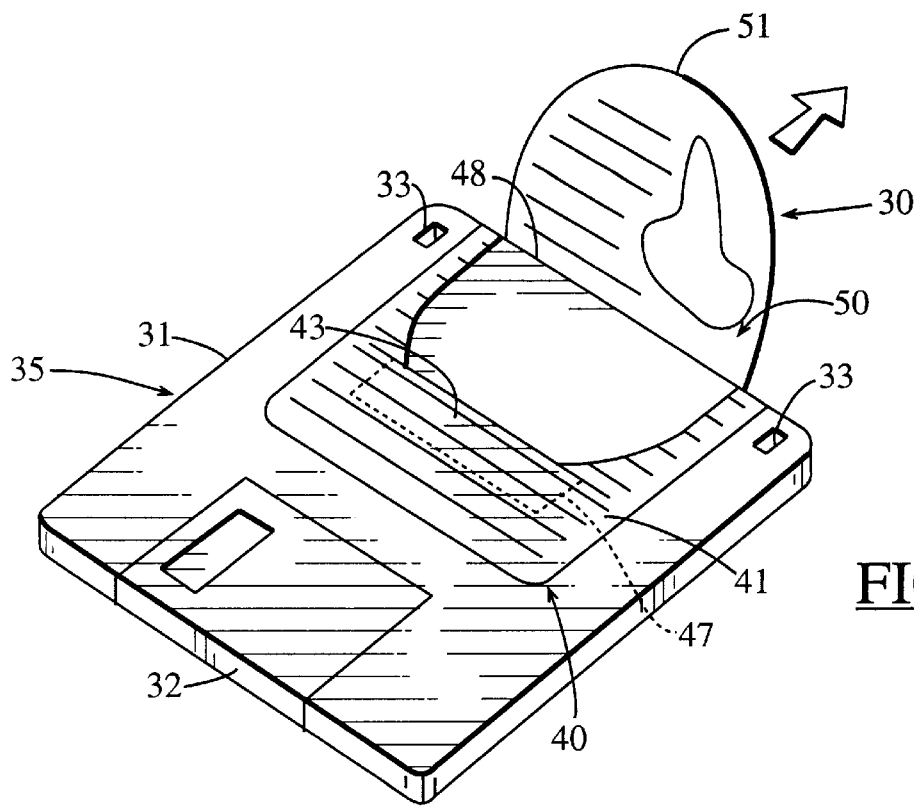
FIG. 8 is a perspective view of the computer disk label on a computer disk with the flapper panel in the open position in accordance with the present invention.
Figure 9:
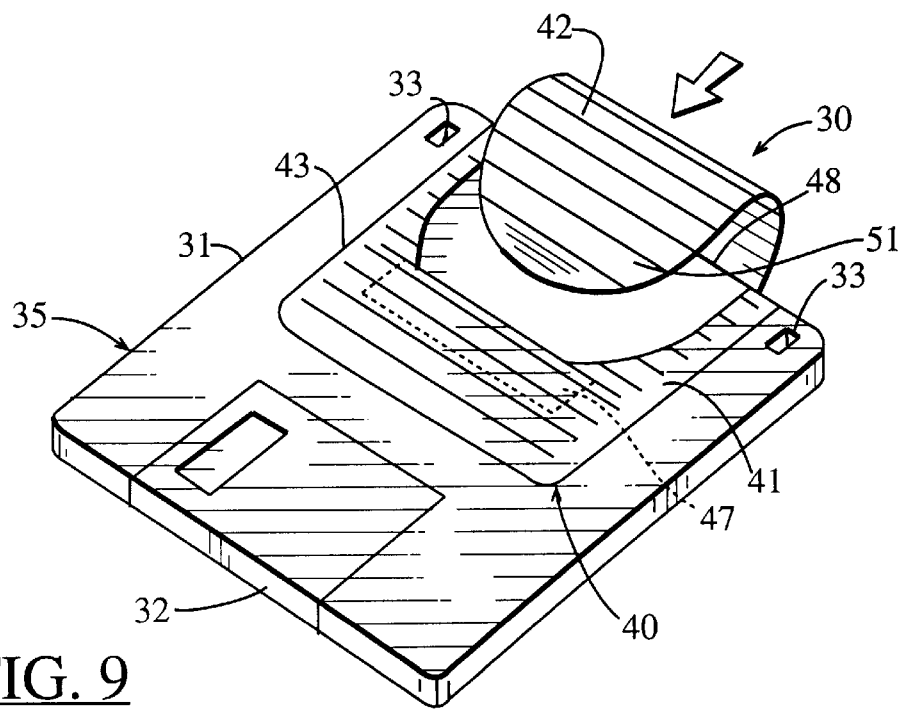
FIG. 9 is a perspective view of the computer disk label on a computer disk with the flapper panel being returned to the closed position from the open position in accordance with the present invention.
Figure 10:
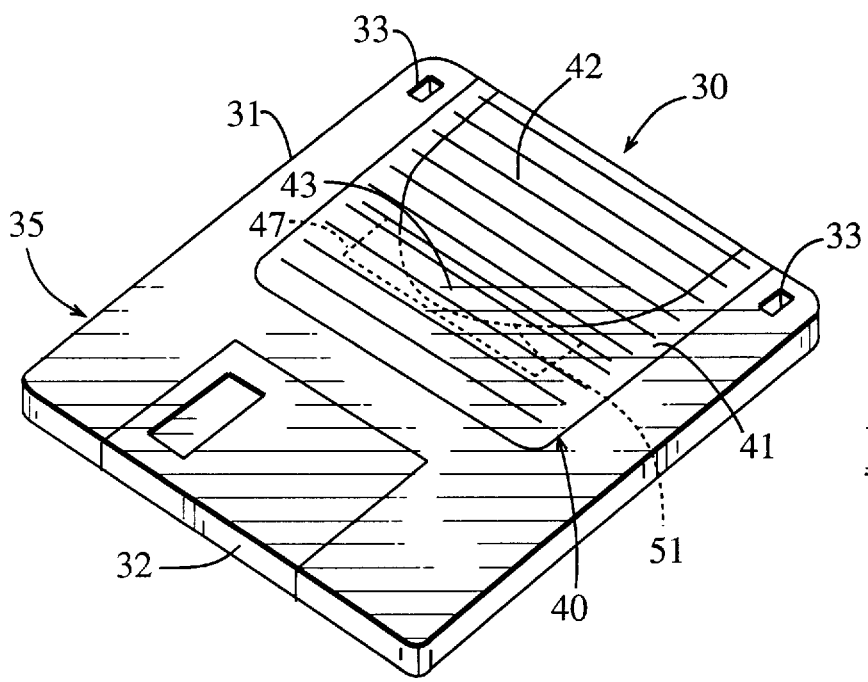
FIG. 10 is a perspective view of the computer disk label on a computer disk with the flapper panel in the closed position in accordance with the present invention.

Turning briefly to FIGS. 8–10, the computer disk 35 may be of the type including a protective generally rectangular jacket 31, sliding cover 32, and openings 33 for write protect tabs, as would be readily understood by those skilled in the art. Those of skill in the art will readily recognize the disk label 30 may be used on other sizes and types of computer disks.

The disk label 30 includes an outer panel 40 which, in turn, comprises a base portion 41 for being connected to the jacket 31, and a flapper portion 42 connected to the base portion defining a hinge. The flapper portion 42 is movable between a closed position adjacent the jacket (FIG. 10) and an open position extending outwardly from the base portion (FIGS. 1 and 8). A pocket defining portion 43 is connected to the base portion for defining a pocket 47 in cooperation with an adjacent portion of the disk jacket 31. The flapper portion 42, base portion 41 and pocket defining portion 43 may be readily integrally formed from a layer of paper having the illustrated die cut 48 as would be readily understood by those skilled in the art. Other materials may also be readily used as would be appreciated by those skilled in the art.

The disk label 30 illustratively includes a flapper panel 50 connected to the flapper portion 42 and being movable therewith between the closed and open positions. The flapper panel 50 preferably has a tip 51 extending outwardly beyond an edge of the of the outer panel flapper portion 42 so that the tip of the flapper panel may be received within the pocket 47 when in the closed position.

The flapper portion 42 of the outer panel 40 is preferably connected to the base portion 41 adjacent an edge of the disk jacket 31 to thereby provide a hinge at the edge (FIGS. 8 and 9) which provides smoother and easier manipulation. The computer disk label 30 may also preferably include securing means for securing the base portion 41 of the outer panel 40 to the jacket 31 and for securing the flapper portion of the outer panel to the flapper panel 50. The securing means illustratively includes an intermediate panel 60 positioned between the base portion 41 of the outer jacket panel 40 and the jacket 31 and between the flapper portion 42 of the outer panel and the flapper panel 50. An adhesive layer is provided on each surface of the intermediate panel and is indicated by stippling.

Figure 6:
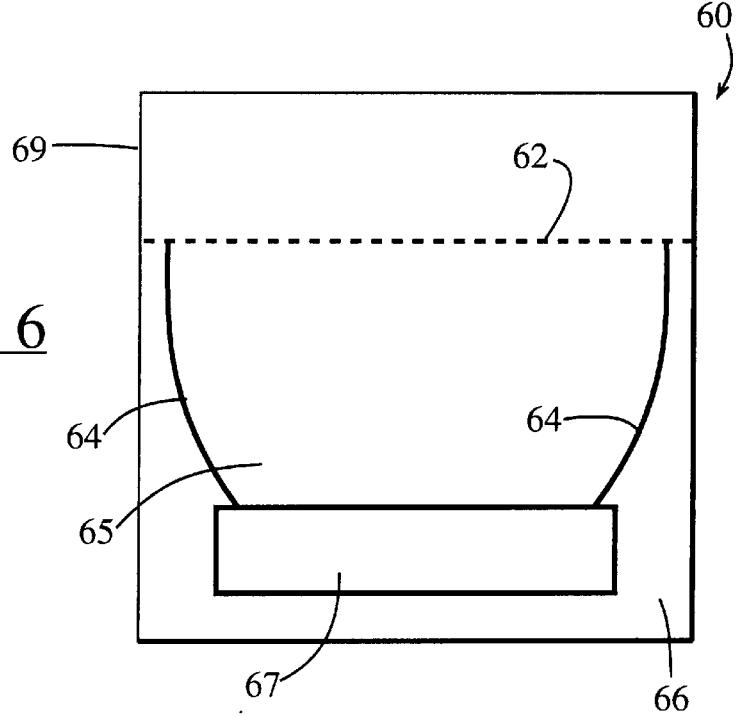
FIG. 6 is a bottom plan view of the intermediate panel of the computer disk label in accordance with the invention.
Figure 7:
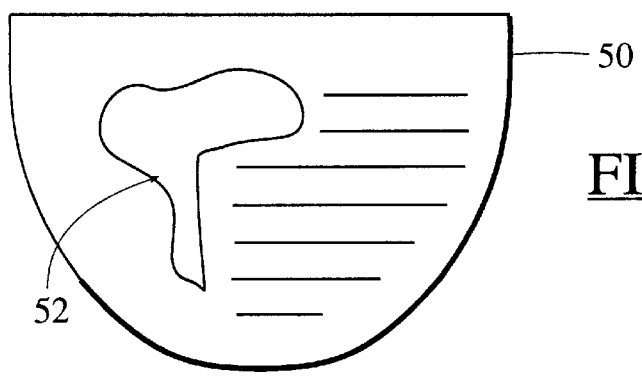
FIG. 7 is a plan view of the flapper panel of the computer disk label which is exposed when the flapper panel is in the open position in accordance with the invention.

The intermediate panel 60 of the disk label 30 includes a line of weakness to further define a hinge between the flapper portion 42 and base portion 41 of the outer panel 40. The line of weakness may be provided by a so-called kiss cut 62 on the bottom surface of the intermediate panel (FIG. 6) as would be readily understood by those skilled in the art. A die cut 64 in the intermediate panel 60 is also provided generally coextensive with the die cut 48 in the flapper portion 42 of the outer panel 40. The illustrated embodiment of the disk label 30 and the intermediate panel 60 includes a flapper portion 65 and a base portion 66 generally coextensive with the corresponding portions of the outer panel 40. However, the intermediate panel 60 has a rectangular cutout 67 which further defines the pocket 47 for the tip 51 of the flapper panel 50. Accordingly, manufacturing and assembly of the disk label 30 are greatly facilitated.

The computer disk jacket 31 is preferably of the type including a pair of opposing surfaces and a plurality of edge portions between opposing surfaces. The base portion 41 of the outer panel 40 preferably includes a wrap around portion 49 to extend around an edge of the jacket and onto the back surface thereof. Similarly, the intermediate panel 60 includes a wrap around portion 69 which wraps around the edge of the jacket 31 and secures the outer panel 40 to the jacket edge and back surface thereof.

Indicia, such as the illustrated plurality of spaced lines 46 may be provided on the outer panel 40 to receive handwritten information, such as the contents of the computer disk written by the user. In addition, the computer disk label 30 preferably further comprises indicia 52 on the underside of the flapper panel 50 so as to be exposed when in the open position (FIGS. 1 and 8).

A method aspect of the present invention is for making a computer disk label 30 to be positioned on a jacket 31 of a computer disk 35. The method preferably comprises the steps of: providing a flapper panel 50; mounting the flapper panel to the jacket so that the flapper panel is movable between a closed position wherein the flapper panel is adjacent the jacket (FIG. 10) and an open position wherein the flapper panel extends outwardly from the jacket FIGS. 1 and 8); and receiving a tip 51 of the flapper panel within a pocket 47 on the jacket when the flapper panel is in the closed position. The step of mounting preferably comprises the steps of providing an outer panel 40 comprising a base portion 41 for being connected to the jacket, and a flapper portion 42 connected to the flapper panel 50 and connected to the base portion defining a hinge therewith; and securing the outer panel to the jacket.

The step of securing may include the steps of providing an adhesive between the base portion 41 of the outer panel 40 and the jacket 31, and between the flapper portion of the outer panel and the flapper panel. More particularly, the step of securing preferably comprises the steps of positioning an intermediate panel 60 between the base portion 41 of the outer panel 40 and the jacket, and between the flapper portion 42 of the outer panel and the flapper panel 50, and providing an adhesive layer on opposing surfaces of the intermediate panel.

The method may further comprise the step of forming a line of weakness 62 in the intermediate panel 60 to further define a hinge between the flapper portion 42 and base portion 41 of the outer panel. In addition, the method may also further comprise the step of providing indicia 52 on the flapper panel 50 so as to be exposed when in the open position.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A computer disk label in combination with a jacket of a computer disk, said computer disk label comprising:
 an outer panel comprising
  a base portion connected to the jacket,
  a flapper portion connected to said base portion defining a hinge therewith so that said flapper portion is movable between a closed position when said flapper portion is positioned adjacent the jacket and an open position when said flapper portion extends outwardly from the base portion, and
  a pocket defining portion connected to said base portion so that a lower surface of said pocket defining portion defines a pocket in cooperation with an adjacent portion of the jacket when said base portion is connected to the jacket so that the lower surface of said pocket defining portion thereby overlies the jacket; and
 a flapper panel connected to said flapper portion and being movable therewith between the closed and open positions, said flapper panel having a tip extending outwardly beyond an edge of the flapper portion of said outer panel, said tip of said flapper panel being received within said pocket when in the closed position.

2. A computer disk label according to claim 1 wherein said flapper portion is connected to said base portion so that the hinge is adjacent an edge of the jacket.

3. A computer disk label according to claim 1 further comprising securing means for securing the base portion of said outer panel to the jacket, and for securing the flapper portion of said outer panel to the flapper panel.

4. A computer disk label according to claim 3 wherein said securing means comprises at least one adhesive layer positioned between the base portion of said outer panel and the jacket, and between the flapper portion of said outer panel and said flapper panel.

5. A computer disk label according to claim 3 wherein said securing means comprises:
 an intermediate panel positioned between the base portion of said outer panel and the jacket, and between the flapper portion of said outer panel and said flapper panel; and
 an adhesive layer on opposing surfaces of said intermediate panel.

6. A computer disk label according to claim 5 wherein said intermediate panel has a line of weakness further defining the hinge between the flapper portion and base portion of said outer panel.

7. A computer disk label according to claim 5 wherein said intermediate panel has an opening therein in registry with the pocket defining portion of said outer panel.

8. A computer disk label according to claim 1 wherein the base portion of said outer panel includes a wrap around portion for covering an edge and back portion of the jacket.

9. A computer disk label according to claim 1 further comprising indicia on said outer panel.

10. A computer disk label according to claim 1 further comprising indicia on said flapper panel so as to be exposed when in the open position.

11. A computer disk label in combination with a jacket of a computer disk, said computer disk label comprising:
 an outer panel comprising a base portion connected to the jacket, and a flapper portion connected to said base portion defining a hinge so that said flapper portion is movable between a closed position adjacent the jacket and an open position extending outwardly from the base portion;
 a flapper panel connected to said flapper portion and being movable therewith between the closed and open positions; and
 an intermediate panel positioned between the base portion of said outer panel and the jacket, and between the flapper portion of said outer panel and said flapper panel.

12. A computer disk label according to claim 11 further comprising an adhesive layer on opposing surfaces of said intermediate panel.

13. A computer disk label according to claim 11 wherein said flapper portion is connected to said base portion so that the hinge is adjacent an edge of the jacket.

14. A computer disk label according to claim 11 wherein said outer panel further comprises a pocket defining portion connected to said base portion for defining a pocket with an adjacent portion of the jacket; and wherein said flapper panel has a tip extending outwardly beyond an edge of the flapper portion of said outer panel to be received within said pocket when in the closed position.

15. A computer disk label according to claim 14 wherein said intermediate panel has an opening therein in registry with the pocket defining portion of said outer panel.

16. A computer disk label according to claim 11 wherein said intermediate panel has a line of weakness further defining the hinge for said flapper panel.

17. A computer disk label according to claim 11 wherein the base portion of said outer panel and said intermediate panel each include a wrap around portion for covering an edge and back portion of the jacket.

18. A computer disk label according to claim 11 further comprising indicia on said outer panel.

19. A computer disk label according to claim 11 further comprising indicia on said flapper panel so as to be exposed when in the open position.

20. A computer disk label in combination with a jacket of a computer disk, said computer disk label comprising:
   a flapper panel; and
   mounting means for mounting said flapper panel to the jacket so that said flapper panel is movable between a closed position wherein said flapper panel is adjacent the jacket and an open position wherein said flapper panel extends outwardly from the jacket, said mounting means further comprising pocket defining means for receiving a tip of said flapper panel when said flapper panel is in the closed position.

21. A computer disk label according to claim 20 wherein said mounting means comprises:
   an outer panel comprising a base portion for being connected to the jacket, and a flapper portion connected to said flapper panel and connected to said base portion defining a hinge therewith; and
   securing means for securing the outer panel to the jacket.

22. A computer disk label according to claim 21 wherein said securing means comprises at least one adhesive layer positioned between the base portion of said outer panel and the jacket and between the flapper portion of said outer panel and said flapper panel.

23. A computer disk label according to claim 21 wherein said securing means comprises:
   an intermediate panel positioned between the base portion of said outer panel and the jacket, and between the flapper portion of said outer panel and said flapper panel; and
   an adhesive layer on opposing surfaces of said intermediate panel.

24. A computer disk label according to claim 23 wherein said intermediate panel has a line of weakness further defining the hinge between the flapper portion and base portion of said outer panel.

25. A computer disk label according to claim 21 further comprising indicia on said outer panel.

26. A computer disk label according to claim 20 further comprising indicia on said flapper panel so as to be exposed when in the open position.

27. A computer disk label in combination with a jacket of a computer disk, said computer disk label comprising:
   an outer panel comprising:
      a base portion connected to the jacket,
      a flapper portion connected to said base portion defining a hinge therewith so that said flapper portion is movable between a closed position when said flapper portion is positioned adjacent the jacket and an open position when said flapper portion extends outwardly from the base portion, and
      a pocket defining portion connected to said base portion for defining a pocket in cooperation with an adjacent portion of the jacket when said base portion is connected to the jacket;
   a flapper panel connected to said flapper portion and being movable therewith between the closed and open positions, said flapper panel having a tip extending outwardly beyond an edge of the flapper portion of said outer panel, said tip of said flapper panel being received within said pocket when in the closed position; and
   securing means for securing the base portion of said outer panel to the jacket and for securing the flapper portion of said outer panel to the flapper panel, said securing means comprising at least one adhesive layer positioned between the base portion of said outer panel and the jacket, and between the flapper portion of said outer panel and said flapper panel.

28. A computer disk label in combination with a jacket of a computer disk, said computer disk label comprising:
   an outer panel comprising a base portion connected to the jacket, and a flapper portion connected to said base portion defining a hinge so that said flapper portion is movable between a closed position when said flapper portion is positioned adjacent the jacket and an open position when said flapper portion extends outwardly from said base portion;
   a flapper panel connected to said flapper portion and being movable therewith between the closed and open positions;
   an intermediate panel positioned between the base portion of said outer panel and the jacket, and between the flapper portion of said outer panel and said flapper panel; and
   a pocket defining portion connected to said base portion of said outer panel for defining a pocket in cooperation with an adjacent portion of the jacket when said base portion is connected to the jacket.

29. A computer disk label in combination with a jacket of a computer disk, said computer disk label comprising:
   a flapper panel;
   mounting means for mounting said flapper panel to the jacket so that said flapper panel is movable between a closed position when said flapper panel is positioned adjacent the jacket and an open position when said flapper panel extends outwardly from the jacket, said mounting means comprising an outer panel comprising a base portion for being connected to the jacket, a flapper portion connected to said flapper panel and connected to said base portion defining a hinge therewith, pocket defining means for receiving a tip of said flapper panel when said flapper panel is in the closed position, and securing means for securing the outer panel to the jacket, said securing means comprising at least one adhesive layer positioned between the base portion of said outer panel and the jacket and between the flapper portion of said outer panel and said flapper panel.

* * * * *